United States Patent

Ballou

[15] 3,671,802
[45] June 20, 1972

[54] VEHICLE HEADLIGHT CONTROL CIRCUIT USING AN AUXILIARY CONTACT ON THE DIMMER SWITCH

[72] Inventor: Richard P. Ballou, Howell, Mich.
[73] Assignee: General Motors Corporation, Detroit, Mich.
[22] Filed: Feb. 8, 1971
[21] Appl. No.: 113,138

[52] U.S. Cl. ............................. 315/83, 200/86.5, 340/76
[51] Int. Cl. ....................................................... B60q 1/06
[58] Field of Search .............. 315/82, 83; 200/86.5; 340/76

[56] References Cited

UNITED STATES PATENTS

| | | |
|---|---|---|
| 2,298,782 | 10/1942 | Bluemle .................................... 315/83 |
| 2,918,604 | 12/1959 | Johnston ................................... 315/82 |
| 3,139,555 | 6/1964 | Paule et al. .............................. 315/82 |
| 3,305,695 | 2/1967 | Late .......................................... 315/82 |
| 3,355,624 | 11/1967 | Guyton et al. .......................... 315/83 |

Primary Examiner—Roy Lake
Assistant Examiner—Siegfried H. Grimm
Attorney—Jean L. Carpenter and Paul Fitzpatrick

[57] ABSTRACT

A solid state vehicle lighting control circuit having two control wires connecting the vehicle headlights to the foot dimmer switch and one control wire connecting the foot dimmer switch to the light switch which turns on the vehicle lights by grounding. A set of normally open contacts in parallel with the vehicle light switch is closed during actuation of the foot dimmer switch to illuminate the vehicle lights independently of the position of the vehicle light switch.

2 Claims, 3 Drawing Figures

PATENTED JUN 20 1972

3,671,802

INVENTOR.
Richard P. Ballou
BY
Paul Fitzpatrick
ATTORNEY

VEHICLE HEADLIGHT CONTROL CIRCUIT USING AN AUXILIARY CONTACT ON THE DIMMER SWITCH

This invention relates to vehicle headlight control circuits and, more specifically, this invention relates to a headlight control circuit in which the foot dimmer switch actuates a switch in parallel with the vehicle light switch for illuminating the vehicle lights independent of the vehicle light switch.

Conventional headlight circuits use a light switch and a foot dimmer switch in series with the vehicle lights which are energized when the headlight switch is in an on position. Although this circuit performs satisfactorily when it is desired to continuously energize either the high or low beam filaments of the vehicle headlamps, it does not lend itself to momentary energization of either the high or low beam filaments of the headlamps such as, for example, when it is desired to use the vehicle lights to attract the attention of the driver of an improperly approaching vehicle or to signal the vehicle immediately ahead to move to the right lane to permit a legal passing.

It is the general object of this invention to provide a vehicle headlamp circuit which will allow the vehicle operator to energize the vehicle headlamp filaments for any desired length of time independently of the vehicle light switch.

It is another object of this invention to provide for a vehicle headlamp lighting circuit in which the vehicle headlamps may be energized by the actuation of the foot dimmer switch independently of the position of the vehicle light switch.

These and other objects of this invention may be best understood with reference to the following description of a preferred embodiment and the Figures in which.

Figure 1:
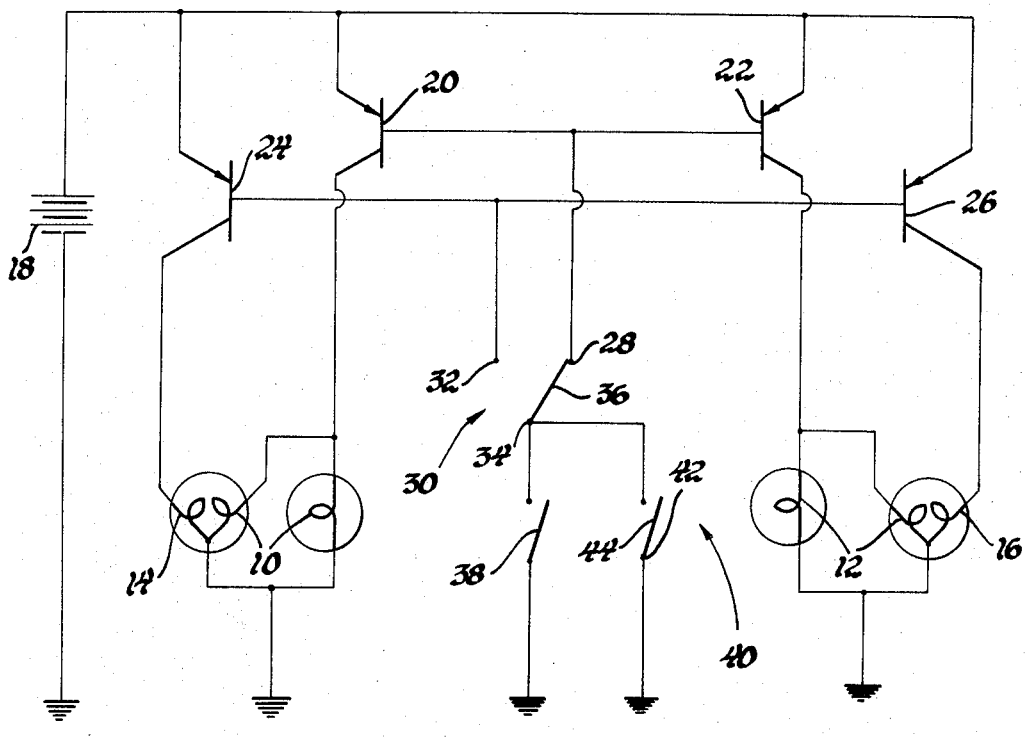
FIG. 1 is a schematic circuit diagram of the preferred embodiment of this invention.

Referring to FIG. 1, there is shown a vehicle headlamp lighting circuit for energizing the left high beam filaments 10, the right high beam filaments 12, the left low beam filament 14 and the right low beam filament 16. A voltage source 18, which may be, for example, the vehicle battery, is connected to the left and right high beam filaments 10 and 12 through a pair of PNP transistors 20 and 22 respectively, and to the left and right low beam filaments 14 and 16 through a pair of PNP transistors 24 and 26 respectively.

The base electrodes of the transistors 20 and 22 are connected to an output terminal 28 of a dimmer switch 30 and the base electrodes of the transistors 24 and 26 are connected to an output terminal 32 of the dimmer switch 30. The dimmer switch 30 also has an input terminal 34 which is either connected to the output terminal 28 or the output terminal 32 by a contact member 36.

The dimmer switch 30 is of the well-known variety and may take the form of the switch shown in the U.S. Pat. No. 3,041,429 which issued to H. V. Elliott on June 26, 1962. For the present time, it is sufficient to say that the contact member 36 alternately connects the input terminal 34 to the output terminals 28 and 32 with each depression of the dimmer switch.

The input terminal 34 is connected to a ground reference through a light switch 38. As can be seen, when the light switch 38 is closed, a ground signal is supplied to either the output terminal 28 to bias the transistors 20 and 22 into conduction to energize the left and right high beam filaments 10 and 12 or the output terminal 32 to bias the transistors 24 and 26 into conduction to energize the left and right low beam filaments 14 and 16. A high beam or low beam condition of the lighting circuit is selected by the operation of the dimmer switch 30.

The input terminal 34 of the dimmer switch 30 is also connected to ground through a circuit in parallel with the light switch 38 including a normally open set of contacts 40 having a stationary contact 42 and a movable contact 44. The movable contact 44 is operatively associated with the dimmer switch 30 such that the contacts 42 and 44 are closed when the dimmer switch 30 is depressed. This operation may be best understood by referring to FIG. 2.

Figure 2:
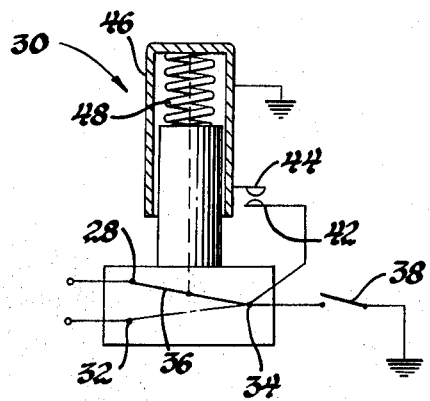
FIG. 2 is a schematic drawing of the modified foot dimmer switch which is utilized in the preferred embodiment of this invention.

Referring to FIG. 2, the dimmer switch 30 includes an actuating shell 46 which is biased in an upward position by a spring 48. The actuating shell 46 is mechanically associated with the contact member 36 such that the contact member 36 alternately connects the input terminal 34 to the output terminals 28 and 32 with each depression of the actuating shell 46. As previously indicated, this form of dimmer switch is well known and, therefore, the specific mechanical configuration will not be described in further detail. The movable contact 44 is connected to the actuating shell 46 and the stationary contact 42 is positioned relative thereto so that upon the depression of the actuating shell 46, the contact 44 engages the contact 42. In addition, the actuating shell 46 is connected to ground reference. Therefore, upon the depression of the actuating shell 46 a ground signal will be supplied to the input terminal 34 through the contacts 42 and 44. The addition of these contacts can be made in any manner known to those skilled in the art suited to the manufacturing process.

Referring to FIGS. 1 and 2, when the vehicle light switch 38 is open, the vehicle operator may yet energize the vehicle lighting circuit by depressing the actuating shell 46 of the dimmer switch 30 to close the contacts 42 and 44 and bias either the transistors 20 and 22 or the transistors 24 and 26 into conduction to energize the high beam filaments 10 and 12 or the low beam filaments 14 and 16 respectively. By holding the actuating shell 46 in the depressed position, the vehicle operator may maintain either the high beam filaments 10 and 12 or the low beam filaments 14 and 16 in an energized condition. In addition, by periodically depressing the actuating shell 46, the vehicle operator may flash the vehicle headlamps, in which case the high beam filaments 10 and 12 and the low beam filaments 14 and 16 would be alternately energized.

One of the many advantages of the preferred embodiment as previously described is that if a ground should occur between the base of the transistors and the dimmer switch or between the dimmer switch and the light switch, the lights will be turned on rather than extinguished, since the headlamps are energized by supplying a ground signal. In addition, if an open circuit should occur between the dimmer switch and the light switch, the vehicle lights may yet be energized by depressing the actuating shell 46 of the dimmer switch 30.

The use of the transistors 20, 22, 24 and 26 reduces to a minimum the current through the contacts of the dimmer switch 30 and the light switch 38. The same features could be obtained with the elimination of the transistors 20, 22, 24, and 26 by applying the potential from the voltage source 18 to the headlamp filaments 10, 12, 14 and 16 at their ground terminals and connecting the remaining terminals to the dimmer switch.

Figure 3:
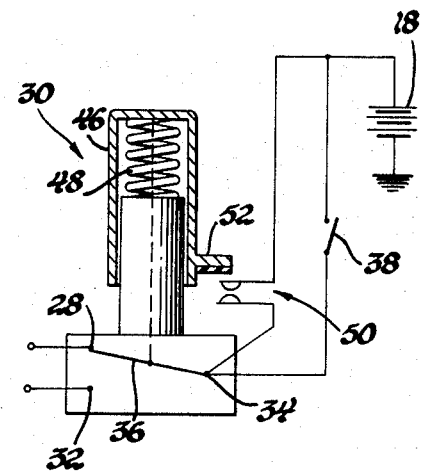
FIG. 3 is a schematic drawing of a modified foot dimmer switch illustrating the invention with reference to a conventional vehicle lighting circuit.

Referring to FIG. 3, there is shown the invention in conjunction with a vehicle having a conventional headlight control system. In this embodiment, the input terminal 34 of the dimmer switch 30 is connected to the vehicle light switch 38 and to one terminal of a set of normally open contacts 50 whose remaining terminal is connected to the voltage source 18. The set of normally open contacts 50 are positioned relative to the actuating shell 46 so as to be closed by an insulated protrusion 52 on the actuating shell 46 when the actuating shell 46 is depressed. As can be seen, the operation of this embodiment is similar to the embodiment previously described with reference to FIG. 2.

The detailed description of the foregoing embodiments of the invention for the purpose of explaining the principles thereof is not to be considered as limiting or restricting the invention, since many modifications may be made by the exercise of skill in the art without departing from the scope of the invention.

It is claimed:

1. A headlight control circuit for an automotive vehicle comprising, in combination, an automotive vehicle current source; high and low beam headlamp filaments; a manually operable light switch; a headlamp beam control switch having a manually operable member that is moved from a neutral position to an actuated position to switch from high to low headlight beam or visa versa; and switch means in parallel with the light switch, the switch means being closed when the manually operable member is moved out of the neutral position towards the actuated position, whereby the high or low beam headlamp filament, as the case may be, is energized with each actuation of the headlamp beam control switch, the high or low beam headlamp filament being energized only while the manually operable member is moved when the light switch is open and the high or low beam filament being energized continuously at all positions of the headlamp beam control switch when the light switch is closed.

2. A headlamp control circuit for an automotive vehicle having a current supply, high and low beam headlamp filaments, a manually operable light switch and a manually operable headlamp beam control switch having two output terminals and an input terminal, the output terminals being alternately connected to the input terminal with each actuation of the headlamp beam control switch comprising, in combination, high beam circuit control means connected to the current supply, the high beam headlamp filaments and one of the output terminals of the headlamp beam control switch, the high beam circuit control means being responsive to a grounding signal at the output terminal for energizing the high beam headlamp filaments; low beam circuit control means connected to the current supply, the low beam headlamp filaments and the other of the output terminals of the headlamp beam control switch, the low beam circuit control means being responsive to a grounding signal at the last-mentioned output terminal for energizing the low beam headlamp filaments; circuit means connecting the light switch between the input terminal of the headlamp beam control switch and the ground potential; and switch means in parallel with the light switch, the switch means being adapted so as to be closed while the headlamp beam control switch is actuated, the light switch and the switch means each supplying a grounding signal to the input terminal of the headlamp beam control switch when closed, whereby the high and low beam headlamp filaments are alternately energized with each actuation of the headlamp beam control switch, the high or low beam headlamp filament being energized only while the headlamp beam control switch is actuated when the light switch is open and the high or low beam filament being energized continuously between actuations of the headlamp beam control switch when the light switch is closed.

* * * * *